United States Patent
Matsuyama et al.

(10) Patent No.: US 10,071,433 B2
(45) Date of Patent: Sep. 11, 2018

(54) FLANGE MECHANISM AND CUTTING APPARATUS

(71) Applicant: DISCO CORPORATION, Tokyo (JP)

(72) Inventors: Toshifumi Matsuyama, Tokyo (JP); Hiromitsu Ueyama, Tokyo (JP); Hayato Kiuchi, Tokyo (JP); Koji Nanbu, Tokyo (JP)

(73) Assignee: Disco Corporation, Tokyo (JP)

( * ) Notice: Subject to any disclaimer, the term of this patent is extended or adjusted under 35 U.S.C. 154(b) by 136 days.

(21) Appl. No.: 14/833,700

(22) Filed: Aug. 24, 2015

(65) Prior Publication Data

US 2016/0059370 A1    Mar. 3, 2016

(30) Foreign Application Priority Data

Aug. 26, 2014  (JP) .................................. 2014-171539

(51) Int. Cl.
   *B23D 59/02*     (2006.01)
(52) U.S. Cl.
   CPC ........... *B23D 59/025* (2013.01); *Y10T 83/293* (2015.04)
(58) Field of Classification Search
   CPC ...... B23D 59/025; B23D 59/02; B23D 59/00; B24B 27/06; B24B 55/02; B26D 1/12; B23Q 11/005; B23Q 11/10
   See application file for complete search history.

(56) References Cited

U.S. PATENT DOCUMENTS

| | | | | | |
|---|---|---|---|---|---|
| 2,413,016 | A | * | 12/1946 | Wiken | B23D 45/044 |
| | | | | | 29/DIG. 68 |
| 2,840,960 | A | * | 7/1958 | Booth | B24B 55/02 |
| | | | | | 204/224 M |
| 4,570,609 | A | * | 2/1986 | Hogue | B23D 59/02 |
| | | | | | 125/13.01 |
| 2004/0149110 | A1 | * | 8/2004 | Kubota | B27B 5/32 |
| | | | | | 83/663 |

FOREIGN PATENT DOCUMENTS

| | | | |
|---|---|---|---|
| JP | 6-71563 | * | 3/1994 |
| JP | 06-071563 | | 3/1994 |
| JP | 08-155949 | | 6/1996 |
| JP | 2003-225844 | | 8/2003 |
| JP | 2010-042490 | | 2/2010 |
| JP | 2011-212815 | | 10/2011 |

* cited by examiner

*Primary Examiner* — Kenneth E. Peterson
*Assistant Examiner* — Liang Dong
(74) *Attorney, Agent, or Firm* — Greer Burns & Crain Ltd.

(57) ABSTRACT

A cutting blade is held between a first flange and a second flange to define an annular cutting water supply chamber between the two flanges. The first flange has a plurality of cutting water supply holes, a first holding surface for holding one side surface of the cutting blade, and a plurality of first supply grooves formed on the first holding surface so as to extend in the radial direction of the first flange. The second flange has a second holding surface for holding the other side surface of the cutting blade and a plurality of second supply grooves extend in the radial direction of the second flange. Cutting water is supplied from the cutting water supply holes to the cutting water supply chamber and then discharged from the first supply grooves and the second supply grooves by centrifugal force due to rotation of a spindle.

3 Claims, 11 Drawing Sheets

FLANGE MECHANISM AND CUTTING APPARATUS

BACKGROUND OF THE INVENTION

Field of the Invention

The present invention relates to a flange mechanism for mounting a cutting blade to a spindle and also to a cutting apparatus including the flange mechanism.

Description of the Related Art

In a cutting apparatus for cutting a workpiece by feeding a rotating cutting blade into the workpiece, a cutting water is supplied from a nozzle to the cutting blade in cutting the workpiece. To prevent the vibration of the cutting blade in the direction of its thickness due to the discharge of the cutting water from the nozzle, the nozzle should be positioned accurately with respect to the cutting blade. To meet this requirement, there has been proposed a technique of using an adjusting jig to adjust the position of the nozzle with respect to the cutting blade (see Japanese Patent Laid-open Nos. 2011-212815 and 2010-42490, for example).

However, even by using the adjusting jig described in Japanese Patent Laid-open Nos. 2011-212815 and 2010-42490, time and effort are still required to accurately position the nozzle and the cutting blade. To cope with this problem, there has been proposed a technique of supplying a cutting water from a spindle through the inside of a flange to a cutting blade mounted through the flange to the spindle without using the nozzle (see Japanese Patent Laid-open Nos. Hei 8-155949 and Hei 6-71563, for example). Further, there has also been proposed a technique of forming an annular groove on the flange for holding the cutting blade, and discharging a cutting water toward the annular groove to thereby supply the cutting water through the inside of the flange to the cutting blade (see Japanese Patent Laid-open No. 2003-225844, for example).

SUMMARY OF THE INVENTION

However, in the structure that the cutting water is supplied from the spindle through the inside of the flange to the cutting blade, it is necessary to provide means for supplying the cutting water into the spindle. Further, in the case that the means for supplying the cutting water into the spindle from the front side of the cutting blade is provided as described in Japanese Patent Laid-open Nos. Hei 8-155949 and Hei 6-71563, this means for supplying the cutting water becomes a hindrance in replacing the cutting blade. Conversely, in the case that the cutting water is supplied from the rear side of the cutting blade into the spindle, it is necessary to form a water passage for passing the cutting water in the spindle. Further, a seal mechanism for preventing the leak of the cutting water is also necessary, thus causing complication of the structure of the spindle.

In the structure that the cutting water is supplied from the annular groove of the flange through the inside of the flange to the cutting blade, no time and effort are required to position the nozzle and the cutting blade and no hindrance is present in replacing the cutting blade. Furthermore, any complicated structure for preventing the leak of the cutting water is not required. However, since the annular groove is formed on the flange, there is a possibility that the strength of the flange may be reduced. Such a reduction in strength of the flange causes a problem such that a holding force of the flange for holding the cutting blade is reduced and the accuracy of cutting by the cutting blade is accordingly reduced.

It is therefore an object of the present invention to provide a flange mechanism which can eliminate the time and effort required for positioning in supplying the cutting water to the cutting blade and can also eliminate the hindrance in replacement of the cutting blade.

In accordance with an aspect of the present invention, there is provided a flange mechanism for holding an annular cutting blade for cutting a workpiece, the flange mechanism being adapted to be fixed to the front end of a rotatable spindle, the flange mechanism including a first flange for holding one side surface of the cutting blade; and a second flange for holding the other side surface of the cutting blade, whereby the cutting blade is sandwiched between the first flange and the second flange; the first flange having a first mount hole adapted to engage the spindle; a circular cylindrical hub portion formed around the first mount hole; a plurality of cutting water supply holes formed radially outside of the hub portion about the axis of the first flange; a first holding surface annularly formed radially outside of the cutting water supply holes about the axis of the first flange, the first holding surface being adapted to abut against one side surface of the cutting blade; and a plurality of first supply grooves formed on the first holding surface so as to extend in the radial direction of the first flange; the second flange having a second mount hole adapted to engage the hub portion of the first flange; a second holding surface annularly formed radially outside of the second mount hole about the axis of the second flange, the second holding surface being adapted to abut against the other side surface of the cutting blade, whereby the cutting blade is sandwiched between the first holding surface and the second holding surface; and a plurality of second supply grooves formed on the second holding surface so as to extend in the radial direction of the second flange; an annular cutting water supply chamber being defined between the first flange and the second flange so as to communicate with the cutting water supply holes, the first supply grooves, and the second supply grooves in the condition where the cutting blade is held between the first flange and the second flange; a cutting water being supplied from the cutting water supply holes to the cutting water supply chamber and then discharged from the first supply grooves and the second supply grooves by a centrifugal force due to the rotation of the spindle.

Preferably, the first supply grooves and the second supply grooves are respectively opposed to each other with the cutting blade interposed therebetween.

In accordance with another aspect of the present invention, there is provided a cutting apparatus including a chuck table for holding a workpiece; and cutting means for cutting the workpiece held on the chuck table by using a cutting blade mounted through a flange mechanism to a rotatable spindle; the flange mechanism including a first flange for holding one side surface of the cutting blade; and a second flange for holding the other side surface of the cutting blade, whereby the cutting blade is sandwiched between the first flange and the second flange; the first flange having a first mount hole adapted to engage the spindle; a circular cylindrical hub portion formed around the first mount hole; a plurality of cutting water supply holes formed radially outside of the hub portion about the axis of the first flange; a first holding surface annularly formed radially outside of the cutting water supply holes about the axis of the first flange, the first holding surface being adapted to abut against one side surface of the cutting blade; and a plurality of first supply grooves formed on the first holding surface so as to extend in the radial direction of the first flange; the second flange having a second mount hole adapted to engage the hub portion of the first flange; a second holding surface annularly formed radially outside of the second mount hole about the axis of the second flange, the second holding surface being adapted to abut against the other side surface of the cutting blade, whereby the cutting blade is sandwiched between the first holding surface and the second holding surface; and a plurality of second supply grooves formed on the second holding surface so as to extend in the radial direction of the second flange; an annular cutting water supply chamber being defined between the first flange and the second flange so as to communicate with the cutting water supply holes, the first supply grooves, and the second supply grooves in the condition where the cutting blade is held between the first flange and the second flange; the cutting means having the cutting blade for cutting the workpiece; the flange mechanism for holding the cutting blade; the spindle for mounting the flange mechanism thereon; a housing for rotatably supporting the spindle; a discharge opening formed between an outer circumferential surface of the spindle and an inner circumferential surface of the housing for discharging a fluid toward the first flange; and a blade cover mechanism for covering the flange mechanism and the cutting blade held by the flange mechanism, the blade cover mechanism having a first blade cover opposed to the first flange; the first blade cover having an outlet opening for discharging a cutting water supplied from a cutting water source toward the first flange; the cutting water which is discharged from the outlet opening of the first blade cover being supplied from the cutting water supply holes of the first flange to the cutting water supply chamber and then discharged from the first supply grooves and the second supply grooves by a centrifugal force due to the rotation of the spindle.

Preferably, the blade cover mechanism further has a second blade cover opposed to the second flange; the second blade cover having a circular opening having an axis coinciding with the axis of rotation of the spindle.

According to the flange mechanism of the present invention, the cutting water supplied from the cutting water supply holes is discharged from the first and second supply grooves. Accordingly, it is unnecessary to position a nozzle, and the cutting water can be supplied to both side surfaces of the cutting blade. Further, the cutting water can be supplied to the cutting blade from the rear side thereof, so that means for supplying the cutting water does not become a hindrance in replacing the cutting blade. Accordingly, the cutting water can be supplied by a simple mechanism without complicating the structure of the spindle. Further, since it is unnecessary to form an annular groove for receiving the cutting water on the flange mechanism, so that a reduction in strength of the flange mechanism can be prevented.

Further, with the arrangement that the second supply grooves are respectively opposed to the first supply grooves, the pressure of the cutting water discharged from the first supply grooves and the pressure of the cutting water discharged from the second supply grooves are equally applied to the cutting blade, so that inclination of the cutting blade in feeding the cutting blade into the workpiece can be prevented.

According to the cutting apparatus of the present invention, the cutting water is discharged from the outlet opening of the first blade cover opposed to the first flange, thereby supplying the cutting water to the first flange. Accordingly, an annular groove is not required on the first flange, so that a reduction in strength of the flange mechanism can be prevented. Further, a fluid such as air is discharged from the discharge opening defined between the spindle and the housing toward the first flange, thereby cooling the first flange to improve the efficiency of cooling of the cutting blade.

Further, with the arrangement that the circular opening is formed at the center of the second blade cover, outside air can be drawn from this opening of the second blade cover by a centrifugal force due to the rotation of the spindle. Accordingly, the second flange opposed to the second blade cover can be cooled by this outside air drawn, thereby improving the efficiency of cooling of the cutting blade.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
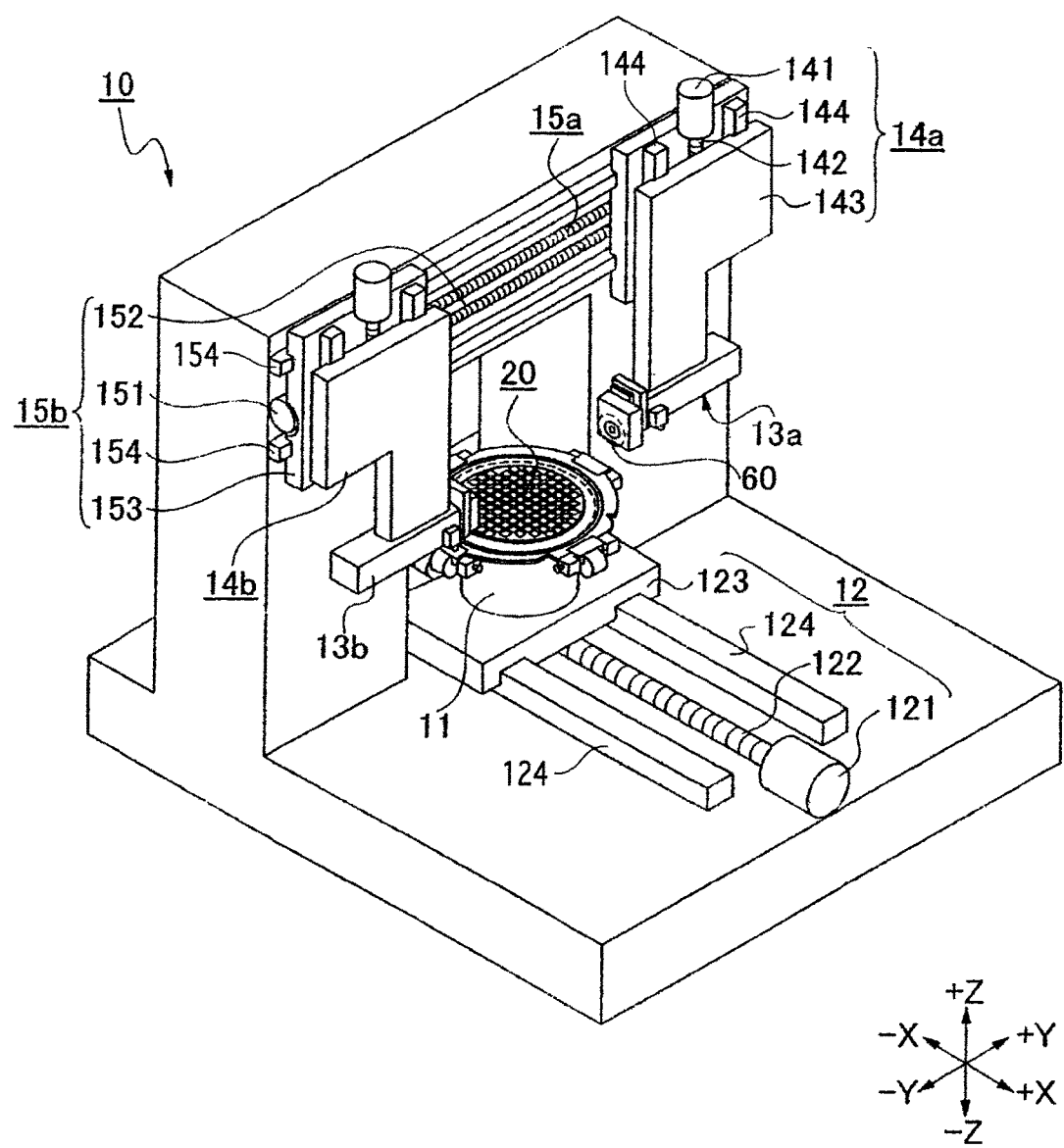
FIG. 1 is a perspective view of a cutting apparatus according to a preferred embodiment of the present invention.

Referring to FIG. 1, there is shown a cutting apparatus 10. The cutting apparatus 10 includes a chuck table 11 for holding a workpiece 20, X moving means 12 for moving the chuck table 11 in the ±X direction shown by an arrow +X or −X in FIG. 1, two cutting means (cutting units) 13a and 13b for cutting the workpiece 20 held on the chuck table 11, two Z moving means 14a and 14b for moving the two cutting means 13a and 13b, respectively, in the ±Z direction shown by an arrow +Z or −Z in FIG. 1, two Y moving means 15a and 15b for moving the two Z moving means 14a and 14b, respectively, in the ±Y direction shown by an arrow +Y or −Y in FIG. 1.

The chuck table 11 is rotatable and it has a holding surface parallel to the XY plane defined by the ±X direction and the ±Y direction. The holding surface of the chuck table 11 functions to hold the workpiece 20 under suction by a suction force applied thereto. The X moving means 12 is configured by a ball screw mechanism including a ball screw 122 parallel to the ±X direction, a motor 121 for rotating the ball screw 122, a moving member 123 threadedly engaged with the ball screw 122, and a pair of guide rails 124 for guiding the moving member 123, whereby when the ball screw 122 is rotated by the motor 121, the moving member 123 is moved in the ±X direction along the guide rails 124. The chuck table 11 is fixed to the moving member 123, so that the chuck table 11 is moved by the movement of the moving member 123 in the ±X direction.

Each of the cutting means 13a and 13b has a cutting blade 60. The cutting blade 60 is rotated and fed downward to cut the workpiece 20. The cutting blade 60 in the cutting means 13b is not shown in FIG. 1. Each of the Z moving means 14a and 14b is configured by a ball screw mechanism including a ball screw 142 parallel to the ±Z direction, a motor 141 for rotating the ball screw 142, a moving member 143 threadedly engaged with the ball screw 142, and a pair of guide rails 144 for guiding the moving member 143, whereby when the ball screw 142 is rotated by the motor 141, the moving member 143 is moved in the ±Z direction along the guide rails 144. The cutting means 13a and 13b are fixed to the moving members 143 of the Z moving means 14a and 14b, respectively, so that the cutting means 13a and 13b are moved by the movement of the moving members 143 of the Z moving means 14a and 14b in the ±Z direction, respectively.

Each of the Y moving means 15a and 15b is configured by a ball screw mechanism including a ball screw 152 parallel to the ±Y direction, a motor 151 for rotating the ball screw 152, a moving member 153 threadedly engaged with the ball screw 152, and a pair of guide rails 154 for guiding the moving member 153, whereby when the ball screw 152 is rotated by the motor 151, the moving member 153 is moved in the ±Y direction along the guide rails 154. The Z moving means 14a and 14b are fixed to the moving members 153 of the Y moving means 15a and 15b, respectively, so that the Z moving means 14a and 14b are moved by the movement of the moving members 153 of the Y moving means 15a and 15b in the ±Y direction, respectively. Accordingly, the cutting means 13a and 13b are also moved in the ±Y direction.

In this cutting apparatus 10, the chuck table 11 is rotated about its axis extending in the ±Z direction, thereby making the cut lines formed on the workpiece 20 held on the chuck table 11 parallel to the ±X direction. Further, the cutting means 13a is moved in the ±Y direction by the Y moving means 15a to thereby make the Y position of the cutting blade 60 of the cutting means 13a in the ±Y direction into alignment with a predetermined one of the cut lines formed on the workpiece 20. In this condition, the cutting blade 60 of the cutting means 13a is rotated and the cutting means 13a is moved in the ±Z direction by the Z moving means 14a to thereby feed the cutting blade 60 downward until the cutting blade 60 cuts into the predetermined cut line of the workpiece 20. In this condition, the chuck table 11 is moved in the ±X direction by the X moving means 12 to thereby cut the workpiece 20 along the predetermined cut line. The cutting means 13b, the Z moving means 14b, and the Y moving means 15b are similar in configuration to the cutting means 13a, the Z moving means 14a, and the Y moving means 15a, respectively. Therefore, the operation of the cutting means 13b, the Z moving means 14b, and the Y moving means 15b are similar to the operation of the cutting means 13a, the Z moving means 14a, and the Y moving means 15a described above.

Figure 2:
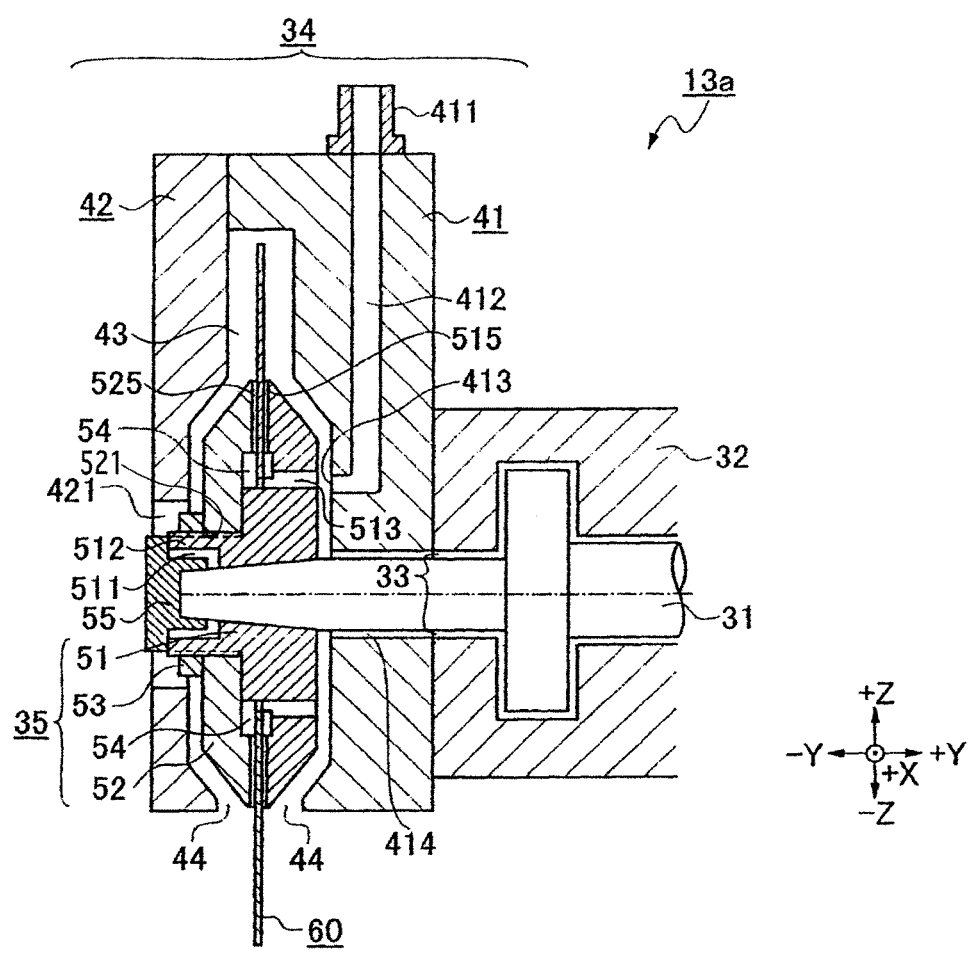
FIG. 2 is an enlarged sectional view of an essential part of cutting means included in the cutting apparatus shown in FIG. 1.

As shown in FIG. 2, the cutting means 13a includes a spindle 31 having a rotation axis extending in the ±Y direction, a housing 32 for rotatably supporting the spindle 31, a flange mechanism 35 for holding the cutting blade 60, and a blade cover mechanism 34 for covering the cutting blade 60 and the flange mechanism 35. Although not shown, the configuration of the cutting means 13b is similar to that of the cutting means 13a described above.

There is defined a gap between the outer circumferential surface of the spindle 31 and the inner circumferential surface of the housing 32, and air flows in this gap to configure an air spindle bearing. This air is blown from a discharge opening 33 toward the flange mechanism 35. The flange mechanism 35 includes a first flange 51 located on the rear side (+Y side) of the spindle 31, a second flange 52 located on the front side (−Y side) of the spindle 31, i.e., on the left side of the first flange 51 as viewed in FIG. 2, and fixing means 53 for fixing the two flanges 51 and 52. The first flange 51 is fixed to the front end portion of the spindle 31, and the second flange 52 is fixed to the first flange 51 in the condition where the cutting blade 60 is sandwiched between the two flanges 51 and 52.

The first flange 51 has a central mount hole 511 adapted to engage the front end portion of the spindle 31 on the −Y side, a hub portion 512 for mounting the second flange 52, and a plurality of cutting water supply holes 513 for supplying a cutting water. Thus, the front end portion of the spindle 31 is engaged with the mount hole 511 of the first flange 51. An external thread is formed at the front end of the spindle 31 on the −Y side, and an internal thread formed on the inner circumference of a first flange fixing nut 55 is threadedly engaged with the external thread of the spindle 31, thereby fixing the first flange 51 to the spindle 31. The hub portion 512 of the first flange 51 is a circular cylindrical portion projecting toward the −Y side so as to surround the mount hole 511. The cutting water supply holes 513 of the first flange 51 are formed radially outside of the hub portion 512 (at a radially distant position about the axis of the first flange 51). On the other hand, the second flange 52 has a central mount hole 521 adapted to engage the hub portion 512 of the first flange 51. Thus, the hub portion 512 of the first flange 51 is engaged with the mount hole 521 of the second flange 52, thereby fixing the second flange 52 to the first flange 51.

As shown in FIG. 2, the blade cover mechanism 34 includes a first blade cover 41 located between the housing 32 and the flange mechanism 35 and a second blade cover 42 located on the −Y side of the flange mechanism 35. A blade chamber 43 is defined between the first blade cover 41 and the second blade cover 42, so as to accommodate the flange mechanism 35 and the cutting blade 60 held thereby. The blade cover mechanism 34 has a blade projection opening 44 for allowing the projection of the cutting blade 60. The blade projection opening 44 is formed at the lower end (−Z side) of the blade cover mechanism 34. Accordingly, the blade chamber 43 is in communication with the outside of the blade cover mechanism 34 through the blade projection opening 44. A part of the cutting blade 60 projects from the blade projection opening 44 to the outside of the blade cover mechanism 34, so as to come into contact with the workpiece 20 (see FIG. 1) and cut the workpiece 20.

The first blade cover 41 has a water inlet member 411 connected to a cutting water source (not shown), a water passage 412 communicating with the water inlet member 411, an outlet opening 413 (a plurality of outlet openings 413 shown in FIG. 8) communicating with the water passage 412, and a circular opening 414 having an axis coinciding with the axis of rotation of the spindle 31. The first blade cover 41 is opposed to the first flange 51. The outlet opening 413 of the first blade cover 41 is formed at a position substantially opposed to any one of the plural cutting water supply holes 513 of the first flange 51. Accordingly, the cutting water is supplied from the cutting water source through the water inlet member 411 and the water passage 412 to the outlet opening 413 and then discharged from the outlet opening 413 toward the first flange 51. The second blade cover 42 has a circular opening 421 having an axis coinciding with the axis of rotation of the spindle 31. The second blade cover 42 is detachably fixed to the first blade cover 41. Accordingly, the cutting blade 60 can be easily replaced by removing the second blade cover 42.

Figure 3:
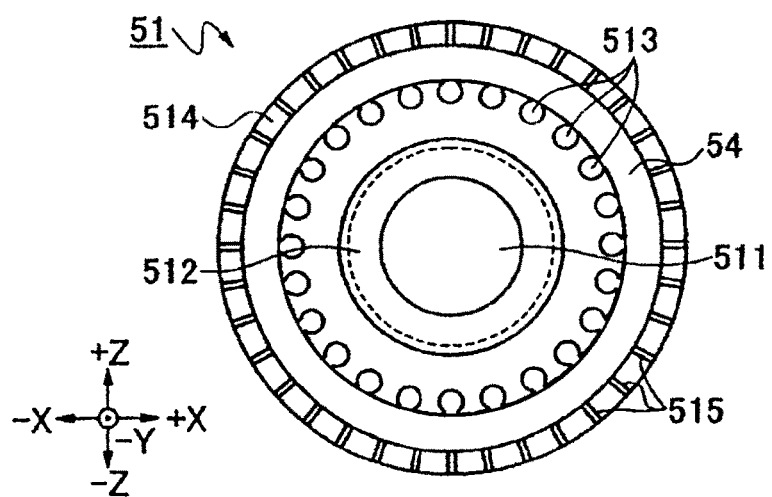
FIG. 3 is a front elevational view of a first flange of a flange mechanism included in the cutting means shown in FIG. 2.

As shown in FIG. 3, an annular holding surface 514 for holding the cutting blade 60 is formed on one side surface of the first flange 51 on the −Y side along the outer circumference of the first flange 51. The holding surface 514 abuts against one side surface of the cutting blade 60 as shown in FIG. 2. The holding surface 514 is formed with a plurality of first supply grooves 515 extending in the radial direction of the first flange 51. The first supply grooves 55 are equally spaced in the circumferential direction of the first flange 51. Each cutting water supply hole 513 is a circular hole extending in the axial direction of the first flange 51 and has an opening directed to the holding surface 514. The plural cutting water supply holes 513 are annularly arranged at the same distance from the axis of the first flange 51. Each cutting water supply hole 513 is in communication with a cutting water supply chamber 54 through the opening of each cutting water supply hole 513.

Figure 4:
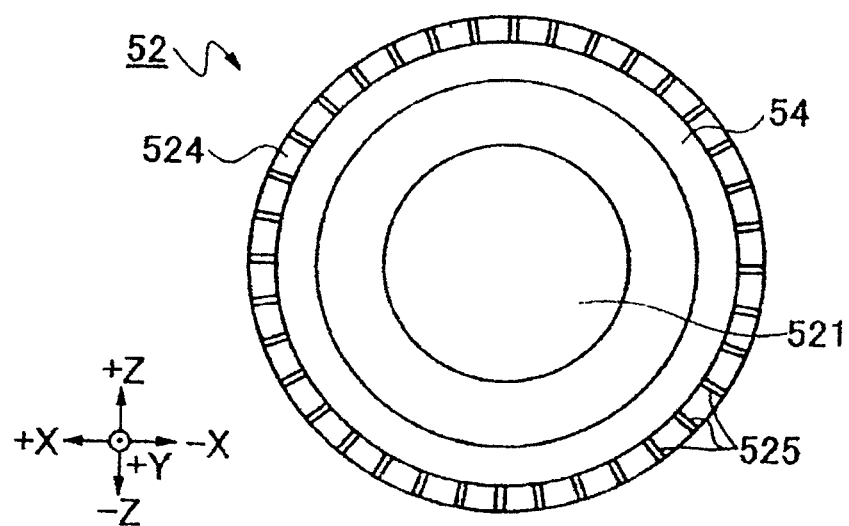
FIG. 4 is a rear elevational view of a second flange of the flange mechanism.

As shown in FIG. 4, an annular holding surface 524 for holding the cutting blade 60 is formed on one side surface of the second flange 52 on the +Y side along the outer circumference of the second flange 51. The holding surface 524 abuts against the other side surface of the cutting blade 60 as shown in FIG. 2. The holding surface 524 is formed with a plurality of second supply grooves 525 extending in the radial direction of the second flange 52. The second supply grooves 525 are equally spaced in the circumferential direction of the second flange 52. The first supply grooves 515 of the first flange 51 are respectively opposed to the second supply grooves 525 of the second flange 52 with the cutting blade 60 interposed therebetween.

Figure 5:
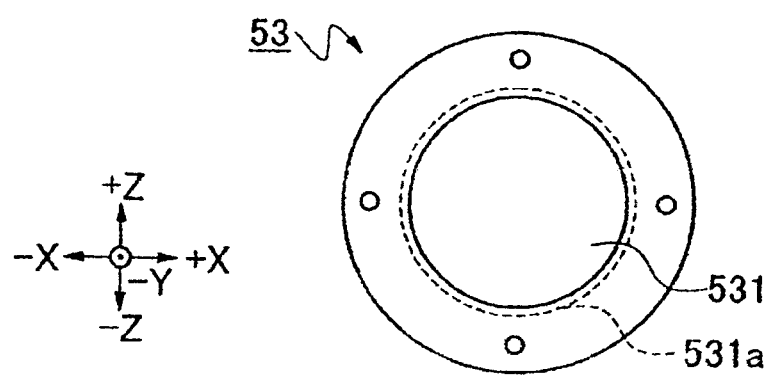
FIG. 5 is a front elevational view of fixing means of the flange mechanism.
Figure 6:
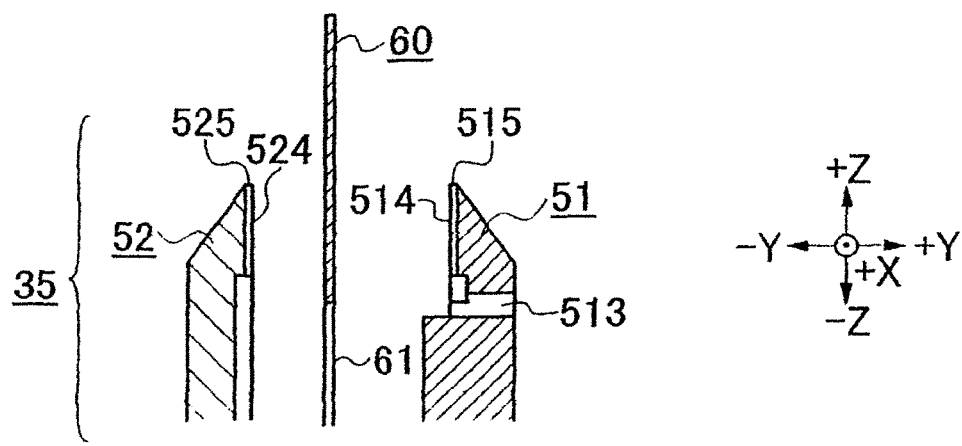
FIG. 6 is an enlarged sectional view showing the flange mechanism and a cutting blade.

As shown in FIG. 5, the fixing means 53 is an annular nut having a central mount hole 531. An internal thread 531a is formed on the inner circumference of the mount hole 531. As shown in FIG. 2, the internal thread 531a of the mount hole 531 of the fixing means 53 is threadedly engaged with an external thread formed on the outer circumference of the hub portion 512, thereby securing the fixing means 53 to the first flange 51. As shown in FIG. 6, the cutting blade 60 is an annular thin plate having a central circular opening 61. The cutting blade 60 is sandwiched between the holding surface 514 of the first flange 51 and the holding surface 524 of the second flange 52.

Figure 7:
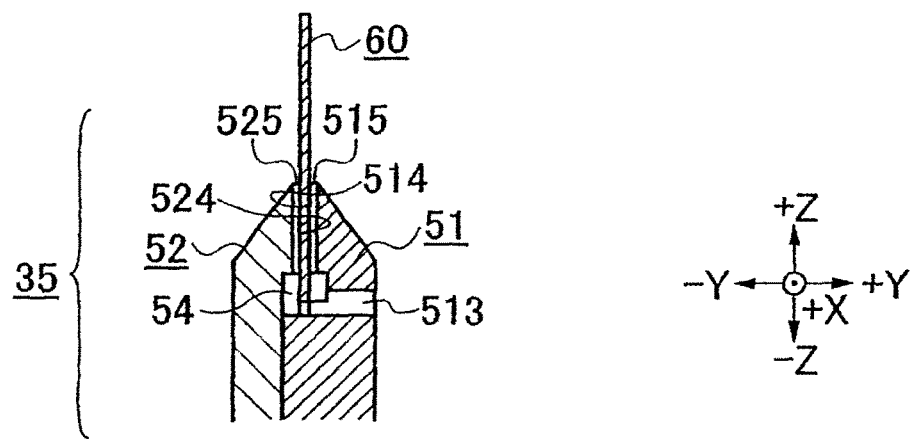
FIG. 7 is an enlarged sectional view showing the condition where the cutting blade is held by the flange mechanism.

As shown in FIG. 7, the cutting water supply chamber 54 is defined between the first flange 51 and the second flange 52 with the cutting blade 60 held therebetween as an annular space defined by the noncontact portions of the first and second flanges 51 and 52 formed radially inside of the holding surfaces 514 and 524. In other words, the side surface of the first flange 51 on the −Y side is in contact with the side surface of the second flange 52 on the +Y side in an area radially inside of the cutting water supply chamber 54. In this condition, the cutting blade 60 is held between the holding surface 514 of the first flange 51 and the holding surface 524 of the second flange 52. The cutting water supply chamber 54 is in communication with the cutting water supply holes 513, the first supply grooves 515, and the second supply grooves 525. The cutting water discharged from the outlet opening 413 of the first blade cover 41 (see FIG. 2) is supplied through the cutting water supply holes 513 to the cutting water supply chamber 54. Thereafter, the cutting water is discharged from the first supply grooves 515 and the second supply grooves 525 toward the outer circumference of the cutting blade 60.

Figure 8:
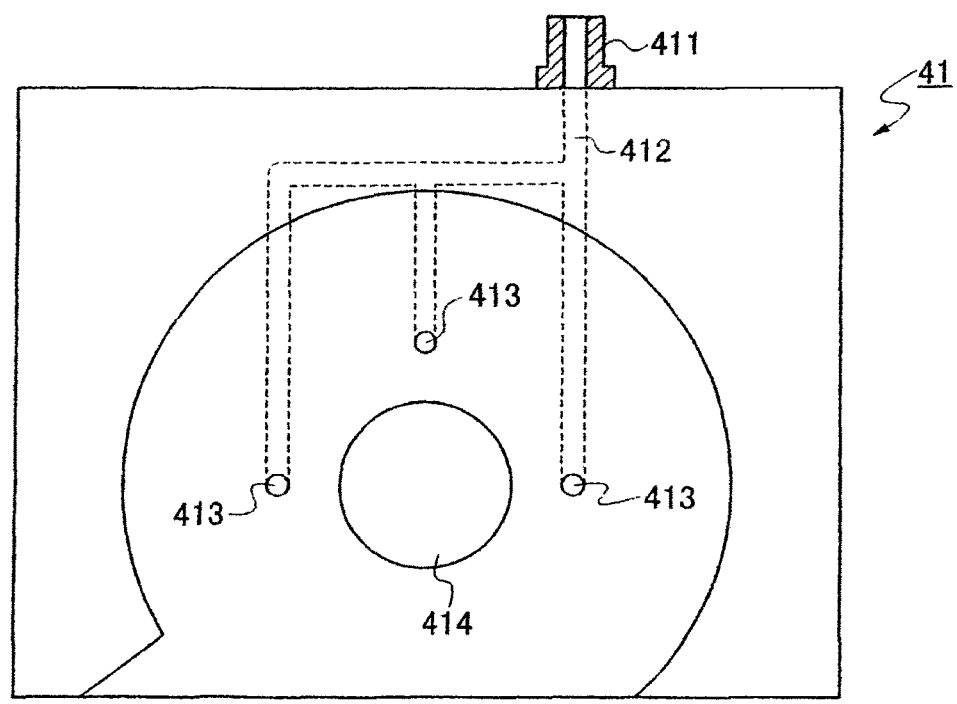
FIG. 8 is a front elevational view of a first blade cover.
Figure 9:
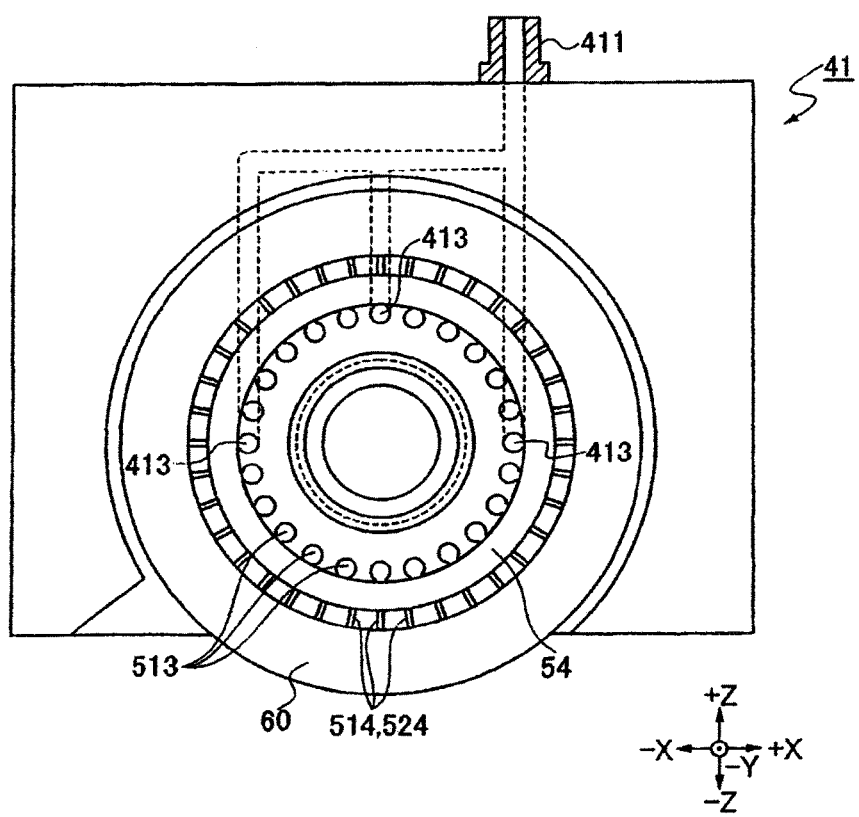
FIG. 9 is a front elevational view showing a positional relation between the first blade cover and the flange mechanism.

As shown in FIG. 8, the first blade cover 41 has the plural outlet openings 413. The plural outlet openings 413 are arranged at the same distance from the center of the circular opening 414 (the axis of rotation of the spindle 31). As shown in FIG. 9, the plural outlet openings 413 of the first blade cover 41 are respectively opposed to the cutting water supply holes 513 of the first flange 51.

As shown in FIG. 2, the flange mechanism 35 is fixed to the spindle 31, so that the flange mechanism 35 is rotated as a unit by the rotation of the spindle 31. Accordingly, the positions of the cutting water supply holes 513 with respect to the outlet openings 413 change with the rotation of the flange mechanism 35. However, any one of the cutting water supply holes 513 becomes opposed to any one of the outlet openings 413, so that the cutting water discharged from the outlet openings 413 is allowed to enter any one of the cutting water supply holes 513 opposed to any one of the outlet openings 413, and then supplied into the cutting water supply chamber 54. Since the first blade cover 41 is opposed to the first flange 51, the amount of the cutting water not entering the cutting water supply holes 513 can be reduced, so that the cutting water can be effectively used.

The cutting water supplied into the cutting water supply chamber 54 is moved radially away from the axis of rotation of the spindle 31 by a centrifugal force due to the rotation of the spindle 31 and then discharged from the first supply grooves 515 and the second supply grooves 525 toward the outer circumference of the cutting blade 60. The plural first supply grooves 515 are formed along the outer circumference of the first flange 51 so as to extend in the radial direction of the first flange 51. Similarly, the plural second supply grooves 525 are formed along the outer circumference of the second flange 52 so as to extend in the radial direction of the second flange 52. Accordingly, the cutting water can be discharged 360 degrees in all the directions. The cutting water discharged flows on both side surfaces of the cutting blade 60 toward the outer circumference thereof, so that the cutting blade 60 can be effectively cooled by the cutting water.

A part of the cutting water is discharged through the blade projection opening 44 to the outside of the blade cover mechanism 34 and directed toward an area where the workpiece 20 is being cut by the cutting blade 60. At this time, cutting dust is washed away by the discharge force of the cutting water. The remaining cutting water discharged in the directions other than the direction toward the blade projection opening 44 flows down on the inner surface of the blade chamber 43 and then expelled from the blade projection opening 44 to the outside of the blade cover mechanism 34. Further, as shown in FIG. 2, the outlet opening 413 and the corresponding cutting water supply hole 513 opposed thereto are slightly deviated in position in the ±Z direction. Accordingly, all of the cutting water discharged from the outlet opening 413 does not enter the corresponding cutting water supply hole 513, but a part of the cutting water discharged flows in the space between the first flange 51 and the first blade cover 41. In this manner, the cutting water discharged from the outlet opening 413 and not entering the corresponding cutting water supply hole 513 is also allowed to flow down on the inner surface of the blade chamber 43 and then expelled from the blade projection opening 44 to the outside of the blade cover mechanism 34. Accordingly, the cutting water directly discharged toward the cutting area and containing the cutting dust can be thinned and washed away by the cutting water flowing in the blade chamber 43, thereby preventing redeposition of the cutting dust on the workpiece 20.

Further, the fluid (air in this preferred embodiment) discharged from the discharge opening 33 is passed through the opening 414 and discharged toward the first flange 51. As a result, the first flange 51 is cooled by this fluid discharged from the opening 414, thereby effectively cooling the cutting blade 60. Further, due to the flow of the cutting water discharged from the first supply grooves 515 and the second supply grooves 525, outside air is drawn from the opening 421 of the second blade cover 42 into the blade cover mechanism 34. As a result, the second flange 52 is cooled by this outside air drawn, thereby effectively cooling the cutting blade 60. The fluid discharged from the discharge opening 33 and the outside air drawn from the opening 421 are finally expelled from the blade projection opening 44 to the outside of the blade cover mechanism 34.

In this manner, the cutting water is supplied from the inside of the flange mechanism 35 to the cutting blade 60. Accordingly, unlike the case that the cutting water is supplied from the outside of the flange mechanism 35 by using a nozzle or the like, it is unnecessary to position the nozzle with respect to the cutting blade 60. Furthermore, time and effort required for replacement of the cutting blade 60 can be greatly reduced. In addition, the cutting water is supplied along the cutting blade 60 to the cutting area, so that the required amount of the cutting water can be reduced.

The means for supplying the cutting water to the inside of the flange mechanism 35 is located on the spindle 31 side (on the rear side of the cutting blade 60) rather than on the front side of the cutting blade 60. Accordingly, in replacing the cutting blade 60, the means for supplying the cutting water does not become a hindrance. Further, the cutting water is supplied directly to the flange mechanism 35 rather than via the spindle 31, so that it is possible to prevent complication of a structure for supplying the cutting water. Further, the outlet opening 413 for discharging the cutting water is formed in the first blade cover 41 opposed to the first flange 51. Accordingly, it is unnecessary to form a groove for receiving the cutting water on the first flange 51, so that a reduction in strength of the flange mechanism 35 can be prevented.

Further, the first supply grooves 515 and the second supply grooves 525 are respectively opposed to each other with the cutting blade 60 interposed therebetween. Accordingly, the pressure of the cutting water discharged from the first supply grooves 515 and the pressure of the cutting water discharged from the second supply grooves 525 are equally applied to both side surfaces of the cutting blade 60, thereby equalizing the resistances of the cutting water against both side surfaces of the cutting blade 60 in feeding the cutting blade 60 into the workpiece 20. As a result, it is possible to prevent inclination of the cutting blade 60 in feeding the cutting blade 60 into the workpiece 20, thereby improving the processing accuracy. Further, the cutting water can be used both to remove the cutting dust and to cool the cutting blade 60. Accordingly, it is unnecessary to supply a cooling water for cooling the cutting blade 60 separately from the cutting water.

Figure 10:
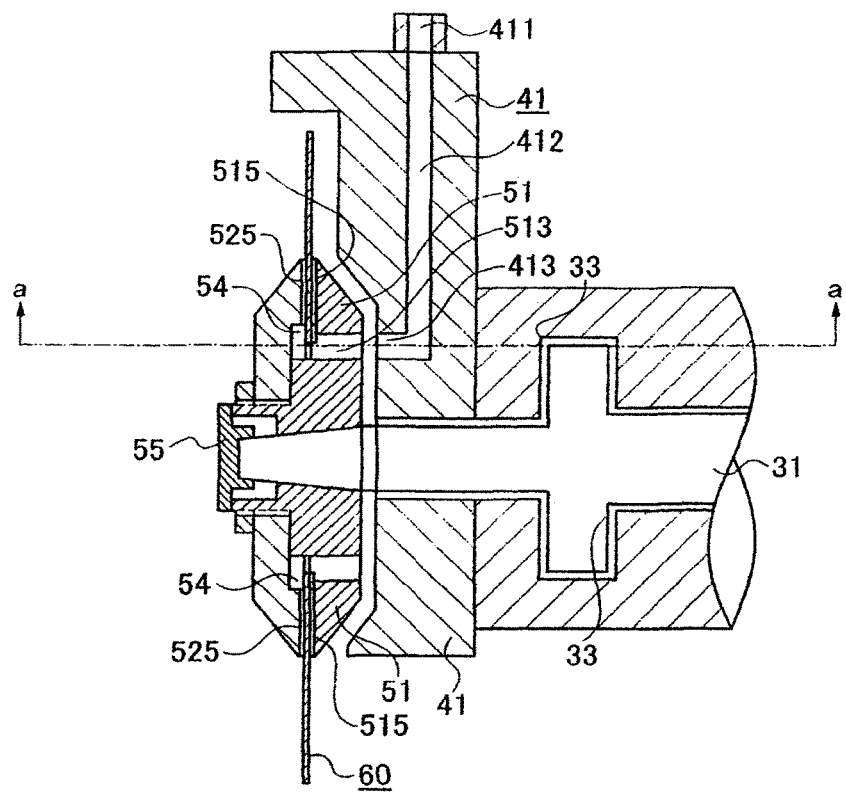
FIG. 10 is an enlarged sectional view similar to FIG. 2, showing a modification of the cutting means.

FIG. 10 shows a modification of the cutting means 13a shown in FIG. 2. That is, according to the modification shown in FIG. 10, the second blade cover 42 is not included in the blade cover mechanism 34, so that the −Y side of the blade cover mechanism 34 is open. With this arrangement, it is possible to prevent heat generation due to the fact that the cutting water discharged from the first supply grooves 515 and the second supply grooves 525 strikes the second blade cover 42. Furthermore, the ambient air around the cutting blade 60 can freely move. Accordingly, the cutting blade 60 can be effectively cooled. In addition, the sectional shape of each cutting water supply hole 513 may be any shape such as a ring shape other than the circular shape shown in FIG. 3.

Figure 11:
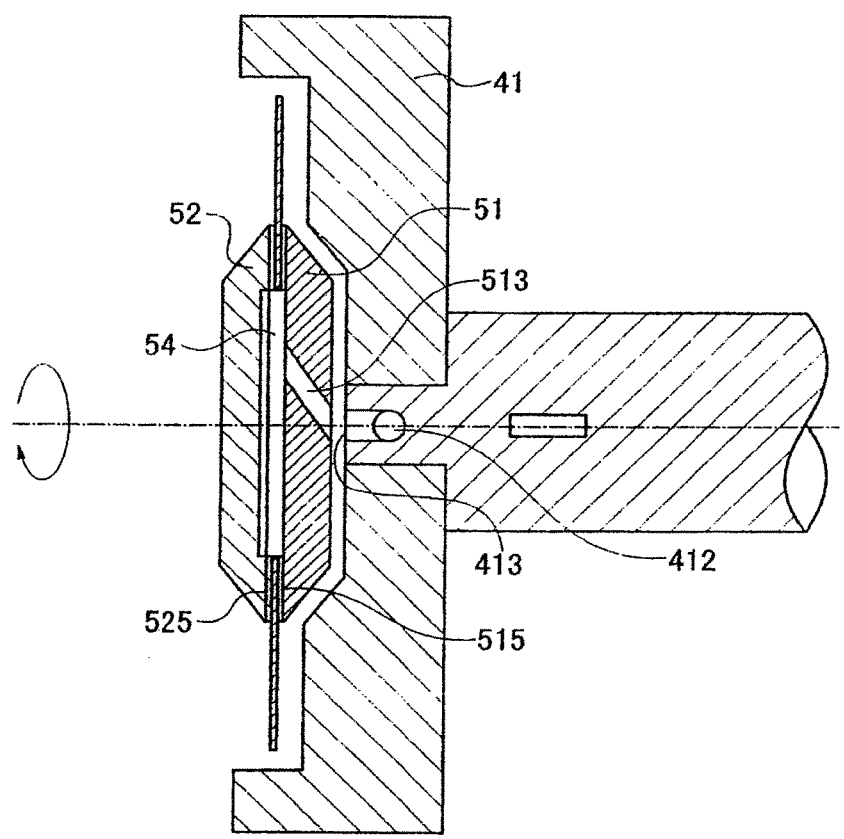
FIG. 11 is a cross section taken along the line a-a in FIG. 10.

Further, as shown in FIG. 11 which is a cross section taken along the line a-a in FIG. 10, both ends of each cutting water supply hole 513 are shifted from each other in the rotational direction of the flange mechanism 35 in such a manner that one end opposed to the outlet opening 413 is shifted to the upstream side of the rotational direction and the other end opening to the cutting water supply chamber 54 is shifted to the downstream side of the rotational direction. With this structure, the cutting water discharged from the outlet opening 413 can be reliably drawn into the cutting water supply chamber 54. Accordingly, the amount of the cutting water not entering the cutting water supply chamber 54 can be reduced, so that the splash of the cutting water flowing in the space between the first flange 51 and the first blade cover 41 can be prevented.

Figure 12:
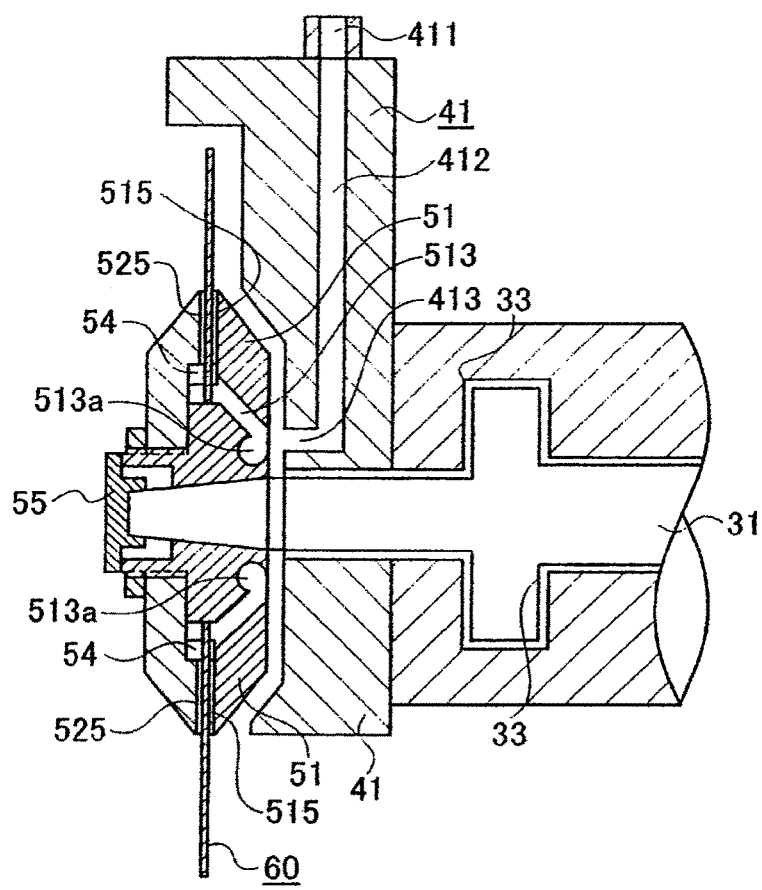
FIG. 12 is an enlarged sectional view similar to FIG. 2, showing another modification of the cutting means.
Figure 13:
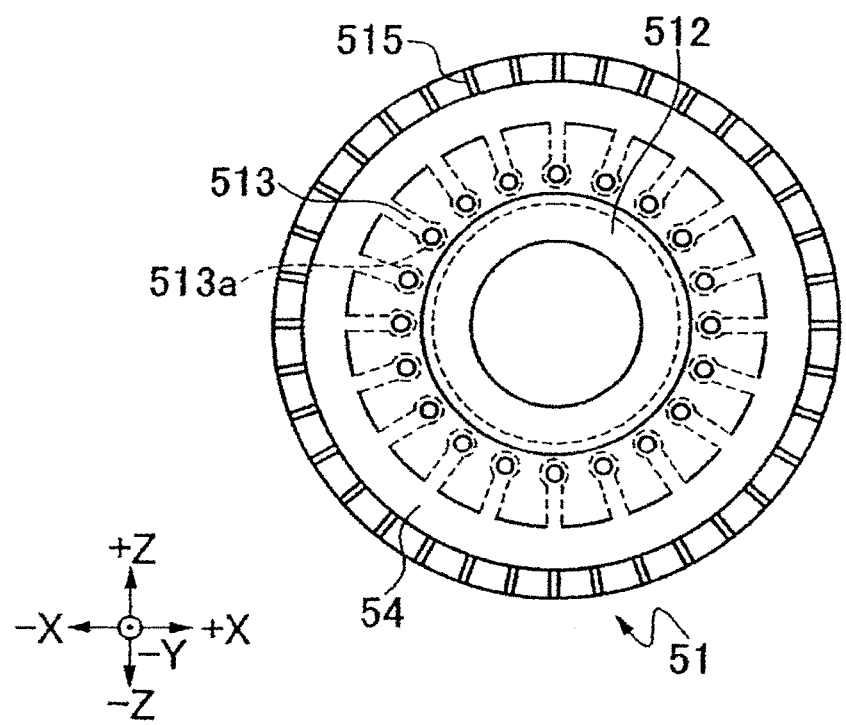
FIG. 13 is a front elevational view of a first flange shown in FIG. 12.

FIG. 12 shows another modification of the cutting means 13a shown in FIG. 2, and FIG. 13 shows a first flange 51 in this modification. According to the modification shown in FIGS. 12 and 13, the outlet opening 413 is located near the spindle 31 in the radial direction thereof so as to be opposed to any one of the cutting water supply holes 513. Further, each cutting water supply hole 513 is inclined with respect to the radial direction of the first flange 51 in such a manner that one end of each cutting water supply hole 513 opposed to the outlet opening 413 is nearer to the spindle 31 than the other end opening to the cutting water supply chamber 54. Further, a hollow 513a for preventing the splash of the cutting water discharged from the outlet opening 413 is formed near one end of each cutting water supply hole 513 opposed to the outlet opening 413. While the plural hollows 513a are respectively formed so as to correspond to the plural cutting water supply holes 513 as shown in FIG. 13, a single annular hollow may be formed so as to connect the plural cutting water supply holes 513. Since the outlet opening 413 is located near the spindle 31 in the radial direction thereof, scattering of the cutting water by the centrifugal force can be prevented. Further, although the cutting water supply holes 513 are reduced in number, the cutting water can be surely received by the hollows 13a and the strength of the first flange 51 can be improved.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A cutting apparatus comprising:
a chuck table for holding a workpiece; and cutting means for cutting said workpiece held on said chuck table by using a cutting blade mounted through a flange mechanism to a rotatable spindle;
said flange mechanism including:
   a first flange for holding one side surface of said cutting blade; and
   a second flange for holding an opposite side surface of said cutting blade, the opposite side surface being opposite to the one side surface, whereby said cutting blade is sandwiched between said first flange and said second flange;
said first flange having:
   a first mount hole adapted to engage said spindle;
   a circular cylindrical hub portion formed around said first mount hole;
   a ring of spaced cutting water supply holes formed radially outside of said hub portion about the axis of said first flange, said first flange having a first surface perpendicular to an axis of said spindle, said first surface being most proximate to a first blade cover, said spaced cutting water supply holes individually inletting at said first surface;
   a first holding surface annularly formed radially outside of said cutting water supply holes about the axis of said first flange, said first holding surface being adapted to abut against the one side surface of said cutting blade; and
   a plurality of first supply grooves formed on said first holding surface so as to extend in the radial direction of said first flange;
said second flange having:
   a second mount hole adapted to engage said hub portion of said first flange;
   a second holding surface annularly formed radially outside of said second mount hole about the axis of said second flange, said second holding surface being adapted to abut against the opposite side surface of said cutting blade, whereby said cutting blade is sandwiched between said first holding surface and said second holding surface; and
a plurality of second supply grooves formed on said second holding surface so as to extend in the radial direction of said second flange;
an annular cutting water supply chamber being defined between said first flange and said second flange so as to communicate with said cutting water supply holes, said first supply grooves, and said second supply grooves in a condition where said cutting blade is held between said first flange and said second flange;
said cutting means having:
   said cutting blade for cutting said workpiece;
   said flange mechanism for holding said cutting blade;
   said spindle for mounting said flange mechanism thereon;
   a housing for rotatably supporting said spindle;
   a discharge opening formed between an outer circumferential surface of said spindle and an inner circumferential surface of said housing for discharging a fluid toward said first flange; and
   a blade cover mechanism for covering said flange mechanism and said cutting blade held by said flange mechanism, said blade cover mechanism having said first blade cover opposed to said first flange;
said first blade cover having an outlet opening for discharging a cutting water supplied from a cutting water source toward said first flange in a direction parallel to said axis of said spindle, a space being defined between a surface of said first blade cover facing said first flange and said first surface of said first flange facing said first blade cover so that some cutting water discharged from the outlet opening enters the cutting water holes and other cutting water is discharged against the first surface without entering the cutting water holes;
said first blade cover having an outlet opening for discharging a cutting water supplied from a cutting water source toward said first flange;
said some cutting water which enters the cutting water supply holes and is discharged from said outlet opening of said first blade cover being supplied from said cutting water supply holes of said first flange to said cutting water supply chamber and then discharged from said first supply grooves and said second supply grooves by a centrifugal force due to the rotation of said spindle,
said other cutting water being directed toward the cutting blade through a blade projection opening.

2. The cutting apparatus according to claim 1, wherein said blade cover mechanism further includes
a second blade cover opposed to said second flange;
said second blade cover having a circular opening having an axis coinciding with the axis of rotation of said spindle;
the second blade cover being detachably fixed to the first blade cover so that the cutting blade can be easily replaced by removing the second blade cover.

3. The cutting apparatus according to claim 1, wherein said outlet opening in said first blade cover includes plural outlet openings arranged at a predetermined distance from an axis of rotation of said spindle and opposed to the cutting water supply holes of said first flange.

* * * * *